(12) United States Patent
Lee et al.

(10) Patent No.: US 8,871,663 B2
(45) Date of Patent: Oct. 28, 2014

(54) ALKALI-FREE GLASS AND PREPARATION THEREOF

(71) Applicant: LG Chem, Ltd., Seoul (KR)

(72) Inventors: Dong-Kwon Lee, Daejeon (KR); Duk-Sik Ha, Daejeon (KR); Han-Kook Kim, Daejeon (KR); Won-Bae Lim, Daejeon (KR); Du-Sun Hwang, Daejeon (KR); Sang-Kook Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/185,323

(22) Filed: Feb. 20, 2014

(65) Prior Publication Data

US 2014/0171286 A1    Jun. 19, 2014

Related U.S. Application Data

(63) Continuation of application No. PCT/KR2012/007016, filed on Aug. 31, 2012.

(30) Foreign Application Priority Data

Sep. 2, 2011  (KR) .................. 10-2011-0089155
Aug. 31, 2012 (KR) .................. 10-2012-0096355

(51) Int. Cl.
  *C03C 3/091*  (2006.01)
  *C03B 18/00*  (2006.01)
  *C03C 3/087*  (2006.01)

(52) U.S. Cl.
  CPC ................ *C03C 3/091* (2013.01); *C03B 18/00* (2013.01); *C03C 3/087* (2013.01)
  USPC ..................... 501/66; 501/70; 65/90; 65/99.2

(58) Field of Classification Search
  CPC ........ C03C 3/091; C03C 3/087; C03B 18/00; C03B 18/02; C03B 18/04
  USPC .................... 501/66, 70; 65/90, 99.2
  See application file for complete search history.

(56) References Cited

U.S. PATENT DOCUMENTS

| | | | |
|---|---|---|---|
| 6,417,124 B1 | 7/2002 | Peuchert et al. | |
| 2007/0027019 A1 | 2/2007 | Nishizawa et al. | |
| 2007/0243992 A1 | 10/2007 | Fechner et al. | |
| 2008/0194394 A1* | 8/2008 | Lecomte | 501/67 |
| 2009/0176640 A1 | 7/2009 | Maehara et al. | |
| 2012/0282450 A1* | 11/2012 | Kawaguchi et al. | 428/220 |

FOREIGN PATENT DOCUMENTS

| | | |
|---|---|---|
| JP | 2010047477 A | 3/2010 |
| KR | 10-2001-0070025 A | 7/2001 |
| KR | 10-2007-0098661 A | 10/2007 |
| KR | 1020090029785 A | 3/2009 |

OTHER PUBLICATIONS

Machine Translation of Korean unexamined Patent Application 10-2012-0096355, published as KR 10-2013-0025839 on Mar. 12, 2013.*

* cited by examiner

*Primary Examiner* — Karl Group
*Assistant Examiner* — Elizabeth A Bolden
(74) *Attorney, Agent, or Firm* — Mckenna Long & Aldridge LLP

(57) ABSTRACT

The present invention provides the composition of an alkali-free glass composition containing no alkali metal oxide and the preparation thereof. The alkali-free glass comprising substantially no alkali metal oxide according to the present invention comprises 68 to 75 wt % of $SiO_2$; 1 to 3 wt % of $B_2O_3$; 4 to 13 wt % of $Al_2O_3$; 1 to 6 wt % of MgO; 1 to 11 wt % of CaO; 4 to 9 wt % of SrO; and 3 to 7 wt % of BaO, based on the total weight of oxides present therein.

16 Claims, 1 Drawing Sheet

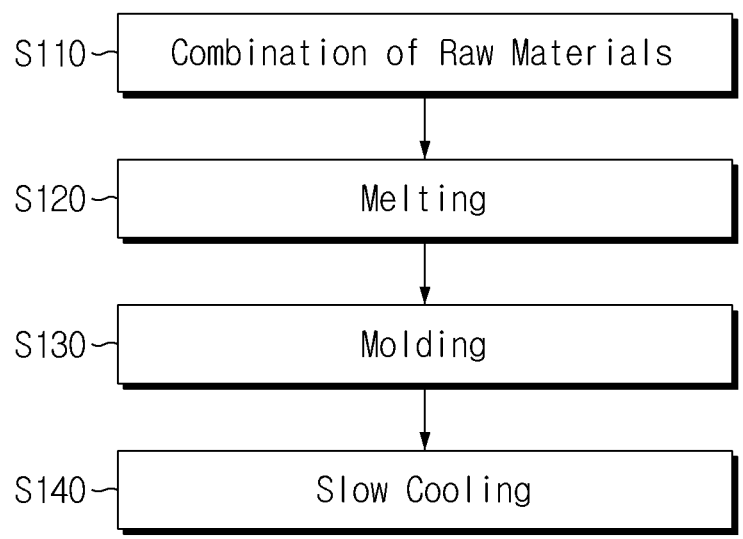

ALKALI-FREE GLASS AND PREPARATION THEREOF

CROSS-REFERENCE TO RELATED APPLICATION

This application is a continuation of International Application No. PCT/KR2012/007016 filed on Aug. 31, 2012, which claims priority to Korean Patent Application Nos. 10-2011-0089155 and 10-2012-0096355 filed in the Republic of Korea on Sep. 2, 2011 and Aug. 31, 2012, respectively, the disclosures of which are incorporated herein by reference.

TECHNICAL FIELD

The present invention relates to a glass manufacturing technology, and more particularly to an alkali-free glass composition comprising no alkali metal oxide and the preparation thereof.

BACKGROUND ART

Glasses, flat glasses in particular, are variously applied to window panes, window screens for vehicles, and mirrors and come in many different forms depending on its type and use.

Among various types of flat glasses, alkali-free glass substrates are widely used in flat panel display devices such as a liquid crystal display (LCD), a plasma display panel (PDP) and an organic electroluminescent (EL). This is because an alkali glass substrate containing an alkali metal oxide may deteriorate film characteristics due to the diffusion of alkali metal ions contained in the glass substrate into a film.

However, glass used in flat panel display substrates requires various characteristics.

For example, a glass for flat panel display substrates should be light weight. In particular, as display devices such as televisions and monitors are becoming larger and larger recently, glass substrates used therein are also enlarging in size. The enlarged size of the glass substrate may increase the bending of the glass substrate due to the weight thereof. Accordingly, in order to prevent such a problem, there is a need to manufacture a light weight glass substrate. Also, such a light weight glass substrate may be used in small portable devices including a mobile phone, a PDP and a notebook to increase portability.

In addition, a glass for flat panel display substrates should have proper melting properties (fusibility). If the melting property of the glass decreases, much time and energy is required for the glass to melt, and bubbles or foreign substances may generate in the glass to cause a fault. The bubbles or foreign substances present in the glass may hinder the penetration of light, deteriorating the quality of the glass, thereby making it difficult to use the glass for display devices.

Further, a glass for flat panel display substrates should have heat-resistance. For example, flat panel display devices such as a TFT-LCD may be subject to heat-treatment during the preparation thereof, at which a glass substrate may be exposed in rapid heating and cooling conditions. If the glass has insufficient heat-resistance, the glass may deform or bend, and may also even break due to tensile stress resulting from heat. In addition, in the case of a glass for a TFT-LCD, if its heat-resistance is low, a thermal expansion difference between the glass and the materials of TFT occurs and the pixel pitch of the TFT may distort to cause a display fault.

DISCLOSURE

Technical Problem

Accordingly, the present invention is designed to solve the above-mentioned problems, and therefore it is an object of the present invention to provide a light weight alkali-free glass having good melting property and easy processability, and a method for preparing the same.

Other objects and advantages of the present disclosure will be understood from the following descriptions, and become more apparent from the Examples. Also, the objects and advantages of the present disclosure can be easily acknowledged to be implemented by means represented in the claims and a combination thereof.

Technical Solution

In order to accomplish the above object, in accordance with one aspect of the present invention, there is provided an alkali-free glass comprising substantially no alkali metal oxide and comprising 68 to 75 wt % of $SiO_2$; 1 to 3 wt % of $B_2O_3$; 4 to 13 wt % of $Al_2O_3$; 1 to 6 wt % of MgO; 1 to 11 wt % of CaO; 4 to 9 wt % of SrO; and 3 to 7 wt % of BaO, based on the total weight of oxides present therein.

Preferably, the alkali-free glass has a density less than 2.5 $g/cm^3$, and a coefficient of thermal expansion of $3.0 \times 10^{-6}/K$ to $4.0 \times 10^{-6}/K$.

Also, preferably, the alkali-free glass has a transformation temperature higher than 670° C., an elastic modulus higher than 77 GPa, and an inherent elastic modulus higher than 31 $GPa \cdot cm^3/g$.

In accordance with another aspect of the present invention, there is provided a display device comprising the above-mentioned glass.

Preferably, the display device is a liquid crystal display.

Further, in accordance with still another aspect of the present invention, there is provided a method for preparing an alkali-free glass, comprising combining raw materials of glass to obtain an alkali-free glass comprising substantially no alkali metal oxide and comprising 68 to 75 wt % of $SiO_2$; 1 to 3 wt % of $B_2O_3$; 4 to 13 wt % of $Al_2O_3$; 1 to 6 wt % of MgO; 1 to 11 wt % of CaO; 4 to 9 wt % of SrO; and 3 to 7 wt % of BaO, based on the total weight of oxides present therein.

Preferably, the combination of raw materials is carried out for BaO to be substantially contained in the alkali-free glass.

Also, it is preferred that the alkali-free glass prepared by the above-mentioned method has a density less than 2.5 $g/cm^3$, and a coefficient of thermal expansion of $3.0 \times 10^{-6}/K$ to $4.0 \times 10^{-6}/K$.

In addition, preferably, the alkali-free glass prepared by the above-mentioned method has a transformation temperature higher than 670° C., an elastic modulus higher than 77 GPa, and an inherent elastic modulus higher than 31 $GPa \cdot cm^3/g$.

Advantageous Effects

In accordance with the present invention, an alkali-free glass comprising substantially no alkali metal oxide can be provided.

Particularly, in accordance with an embodiment of the present invention, an alkali-free glass having a low density can be provided. Accordingly, even if the size of the substrate is big, the alkali-free glass having a low density can be less subject to bending due to its heavy weight, thereby being suitably used in large display devices, for example a television and a monitor. In addition, the glass of the present invention can be adjusted to be light weight, and thus can be used as a glass substrate in small portable devices including a mobile phone, a PDP and a notebook to increase portability.

In addition, the alkali-free glass according to an embodiment of the present invention can exhibit a low coefficient of thermal expansion to prevent the glass from thermal contraction, deformation, bending or breaking even if the glass is exposed in various heat-treatment conditions during preparing flat panel display devices such as a TFT-LCD. Also, the coefficient of thermal expansion of the glass is similar to that of the materials of TFT, thereby effectively preventing a display fault which occurs due to the distortion of a pixel pitch.

Therefore, the alkali-free glass according to the present invention is preferably used as a substrate for flat panel display devices such as a liquid crystal display (LCD), a plasma display panel (PDP) and an organic electroluminescent (EL).

In addition, the alkali-free glass according to an embodiment of the present invention can has a high transformation temperature ($T_g$), thereby exhibiting good stability during a heat-treatment and molding process.

Further, the alkali-free glass according to an embodiment of the present invention can has a high elastic modulus and a high inherent elastic modulus, from which the sufficient mechanical stability of the glass can be ensured. Thereby, the alkali-free glass according to an embodiment of the present invention can be more effectively converted into a larger display format.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

FIG. 1 is a flow chart schematically showing the procedure of a method for preparing an alkali-free glass in accordance with an embodiment of the present invention.

BEST MODE

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the spirit and scope of the disclosure.

The glass of the present invention is an alkali-free glass in which an alkali metal oxide is not substantially contained. That is, the alkali-free glass of the present invention comprises no alkali metal oxide or only a trace amount of alkali metal oxide therein. The term "a trace amount" which is used herein refers to an extremely small amount which is negligible as a component of the glass as compared to other components. For example, if an alkali metal oxide such as $Li_2O$, $Na_2O$ and $K_2O$ is present in an amount of 0.2 wt % or less as a component of the glass, it is considered that the alkali metal oxide is not substantially contained in the glass.

The alkali-free glass of the present invention comprises $SiO_2$, $B_2O_3$, $Al_2O_3$, MgO, CaO, SrO and BaO as the components thereof.

Preferably, the alkali-free glass of the present invention comprises $SiO_2$ in an amount of 68 to 75 wt % based on the total weight of oxides present therein. $SiO_2$ is an oxide which produces a glass-forming network structure, and contributes to increase the chemical resistance of the glass and provide a proper coefficient of thermal expansion to the glass. However, when the amount of $SiO_2$ is extremely high, the coefficient of thermal expansion may decrease and the devitrification property of the glass may be poor. When the amount of $SiO_2$ is extremely small, it may cause the reduction of chemical resistance, the increase of a density and coefficient of thermal expansion, and the reduction of a deformation point in the glass. Accordingly, the glass of the present invention comprises $SiO_2$ in an amount of 68 to 75 wt %, preferably 71 to 75 wt %, more preferably 73 to 75 wt %.

Also, the alkali-free glass of the present invention comprises $B_2O_3$ in an amount of 1 to 3 wt % based on the total weight of oxides present therein. $B_2O_3$ is an oxide which produces the network structure of a glass, and contributes to enhance the characteristics of the glass, for example, the increase of melting reactivity, the decrease of a coefficient of thermal expansion, the improvement of devitrification property and chemical resistance, such as resistance to buffered HF (BHF), and the decrease of a density. However, when the amount of $B_2O_3$ is extremely high, it may cause the reduction of acid resistance, the increase of a density, and the reduction of a deformation point in the glass, thereby deteriorating the heat-resistance of the glass. When the amount of $B_2O_3$ is extremely small, the effect obtained from the inclusion of $B_2O_3$ becomes insufficient. Accordingly, the glass of the present invention comprises $B_2O_3$ in an amount of 1 to 3 wt %, preferably 1.5 to 2.5 wt %.

In addition, the alkali-free glass of the present invention comprises $Al_2O_3$ in an amount of 4 to 13 wt % based on the total weight of oxides present therein. $Al_2O_3$ contributes to enhance the high-temperature viscosity, chemical stability and resistance to thermal shock of the glass and increase the deformation point and Young's modulus of the glass. However, when the amount of $Al_2O_3$ is extremely high, it may cause the deterioration of devitrification property and the reduction of resistance to hydrochloric acid and BHF, and the increase of a viscosity. When the amount of $Al_2O_3$ is extremely small, the effect obtained from the inclusion of $Al_2O_3$ becomes insufficient and the elastic modulus of the glass may be reduced. Accordingly, the glass of the present invention comprises $Al_2O_3$ in an amount of 4 to 13 wt %, preferably 5 to 13 wt %, more preferably 8 to 12 wt %.

In the alkali-free glass of the present invention, the sum of each amount of $SiO_2$ and $Al_2O_3$ (the amount of $SiO_2+Al_2O_3$) is preferably in the range of 79 to 86 wt %. Within such a concentration range, the effect obtained from the inclusion of $SiO_2$ and $Al_2O_3$ may be more improved, and thus the reduction of the coefficient of thermal expansion and the deterioration of the devitrification property may be prevented.

Also, the alkali-free glass of the present invention comprises MgO in an amount of 1 to 6 wt % based on the total weight of oxides present therein. MgO is an alkali earth metal oxide and contributes to inhibit the increase of a coefficient of thermal expansion and the reduction of a deformation point and enhance melting property in the glass. In particular, MgO may reduce the density of the glass, thereby contributing to the lightening of the glass. However, when the amount of MgO is extremely high, it may cause the deterioration of devitrification property and the reduction of resistance to an acid and BHF in the glass. When the amount of MgO is extremely small, the effect obtained from the inclusion of MgO becomes insufficient. Accordingly, the glass of the present invention preferably comprises MgO in an amount of 1 to 6 wt %, more preferably 1 to 5 wt %, most preferably 1 to 3 wt %.

In addition, the alkali-free glass of the present invention comprises CaO in an amount of 1 to 11 wt % based on the total weight of oxides present therein. CaO is an alkali earth metal oxide, similar to MgO, and contributes to reduce a coefficient of thermal expansion and density, inhibit the reduction of a deformation point, and enhance melting property in the glass. However, when the amount of CaO is extremely high, it may cause the increase of a coefficient of thermal expansion and density, and the reduction of chemical resistance, such as resistance to BHF, in the glass. When the amount of CaO is extremely small, the effect obtained from the inclusion of CaO becomes insufficient. Accordingly, the glass of the present invention comprises CaO in an amount of 1 to 11 wt %, preferably 1 to 8 wt %, more preferably 2 to 6 wt %.

Further, the alkali-free glass of the present invention comprises SrO in an amount of 4 to 9 wt % based on the total weight of oxides present therein. SrO is an alkali earth metal oxide and contributes to improve the devitrification property of the glass and the acid resistance thereof. However, when the amount of SrO is extremely high, it may cause the increase of a coefficient of thermal expansion and density, and the deterioration of devitrification property in the glass. When the amount of SrO is extremely small, the effect obtained from the inclusion of SrO becomes insufficient. Accordingly, the glass of the present invention comprises SrO in an amount of 4 to 9 wt %, preferably 4 to 6.5 wt %, more preferably 4 to 5.5 wt %.

Also, the alkali-free glass of the present invention comprises BaO in an amount of 3 to 7 wt % based on the total weight of oxides present therein. BaO contributes to improve the drug resistance or devitrification property of the glass. However, when the amount of BaO is extremely high, it may increase the density of the glass and may not be preferred in terms of environment. When the amount of BaO is extremely small, the effect obtained from the inclusion of BaO becomes insufficient. Accordingly, the glass of the present invention comprises BaO in an amount of 3 to 7 wt %, preferably 3 to 6 wt %, more preferably 3 to 4 wt %.

In the alkali-free glass of the present invention, the sum of each amount of MgO, CaO, SrO and BaO (the amount of MgO+CaO+SrO+BaO) is preferably in the range of 9 to 21 wt %. Within such a concentration range, the effect obtained from the inclusion of alkali earth metals may be more improved, and the devitrification property may be not be deteriorated. More preferably, the amount of MgO+CaO+SrO+BaO is in the range of 11 to 19 wt %, most preferably 13 to 17 wt %.

In the present invention, it is preferred that the alkali-free glass has a density less than 2.5 g/cm$^3$. In accordance with such an embodiment of the present invention, the density of the glass is low, thereby easily accomplishing the lightening of glass products. In particular, as devices using a glass become larger and larger, the size of the glass also increases. In this circumstance, the reduction of a glass density can reduce the bending of the glass due to its weight, as well as the weight of devices using the glass. Also, when used in small portable devices, the weight of the glass can be reduced to increase the portability of the small portable devices.

Also, it is preferred that the alkali-free glass of the present invention has a coefficient of thermal expansion (CTE) of $3.0 \times 10^{-6}$/K to $4.0 \times 10^{-6}$/K. In accordance with such an embodiment of the present invention, the coefficient of thermal expansion of the glass is low, thereby providing good resistance to thermal shock. Accordingly, the glass of the present invention can be prevented from thermal contraction, deformation, bending or breaking even if the glass is repeatedly exposed in various heat-treatment conditions. Also, such coefficient of thermal expansion is similar to that of the materials of TFT, thereby effectively preventing a display fault due to a thermal expansion difference between the glass and the materials of TFT in the preparation of a TFT-LCD using the glass of the present invention.

In addition, preferably, the alkali-free glass of the present invention has a transformation temperature ($T_g$) higher than 670° C. Accordingly, the alkali-free glass of the present invention has high heat-resistance due to such a high $T_g$, thereby exhibiting good stability during a heat-treatment and molding process.

Additionally, the alkali-free glass of the present invention can has an elastic modulus higher than 77 GPa, and an inherent elastic modulus higher than 31 GPa·cm$^3$/g, from which the sufficient mechanical stability of the glass can be ensured, and a sagging problem generated in a glass substrate can be prevented.

Further, the present invention provides a display device comprising the above-mentioned alkali-free glass. That is, the display device of the present invention comprises, as a glass substrate, an alkali-free glass comprising substantially no alkali metal oxide and comprising 68 to 75 wt % of SiO$_2$; 1 to 3 wt % of B$_2$O$_3$; 4 to 13 wt % of Al$_2$O$_3$; 1 to 6 wt % of MgO; 1 to 11 wt % of CaO; 4 to 9 wt % of SrO; and 3 to 7 wt % of BaO, based on the total weight of oxides present therein. The alkali-free glass substrate used in the display device of the present invention has a density less than 2.5 g/cm$^3$, and a coefficient of thermal expansion of $3.0 \times 10^{-6}$/K to $4.0 \times 10^{-6}$/K. Also, such alkali-free glass substrate can has a transformation temperature ($T_g$) higher than 670° C., an elastic modulus higher than 77 GPa, and an inherent elastic modulus higher than 31 GPa·cm$^3$/g.

In particular, the display device of the present invention is preferably a liquid crystal display (LCD). The liquid crystal display such as TFT-LCD may comprise a glass substrate (panel), and the glass substrate may have the above-mentioned compositions and properties. Also, the display device of the present invention may include various display devices such as PDP, as well as the LCD device.

Furthermore, the present invention provides a method for preparing the above-mentioned alkali-free glass, which will be explained hereinafter.

FIG. 1 is a flow chart schematically showing the procedure of a method for preparing an alkali-free glass in accordance with an embodiment of the present invention.

Referring to FIG. 1, first, the raw material of each component contained in a glass is combined with each other to obtain the desired composition (S110). In step S110, the raw materials are combined such that 68 to 75 wt % of SiO$_2$; 1 to 3 wt % of B$_2$O$_3$; 4 to 13 wt % of Al$_2$O$_3$; 1 to 6 wt % of MgO; 1 to 11 wt % of CaO; 4 to 9 wt % of SrO; and 3 to 7 wt % of BaO are comprised, based on the total weight of oxides, in the glass, and an alkali metal oxide is not comprised therein. Preferably, in step S110, the raw materials are combined such that 71 to 75 wt % of SiO$_2$, 1.5 to 2.5 wt % of B$_2$O$_3$, 5 to 13 wt % of Al$_2$O$_3$, 1 to 5 wt % of MgO, 1 to 8 wt % of CaO, 4 to 6.5 wt % of SrO, and 3 to 6 wt % of BaO are comprised in the glass. More preferably, in step S110, the raw materials are combined such that 73 to 75 wt % of $SiO_2$, 8 to 12 wt % of $Al_2O_3$, 1 to 3 wt % of MgO, 2 to 6 wt % of CaO, 4 to 5.5 wt % of SrO, and 3 to 4 wt % of BaO are comprised in the glass. Also, in step S110, the raw materials may be combined such that the sum amount of MgO+CaO+SrO+BaO is in the range of 9 to 21 wt %, preferably 11 to 19 wt %, more preferably 13 to 17 wt %.

Next, the combined raw materials are heated to a prescribed temperature, for example, 1500 to 1600° C. to be melted (S120), and the melted resultant is molded as a glass (S130). In step S130, the molding of the glass may be carried out by means of a float method using a float bath, but the present invention is not limited thereto. For example, in step S130, the molding of the glass may also be carried out by means of a down draw or fusion method.

After molding in step S130, the molded glass is transferred into a lehr and slowly cooled therein (S140). Then, the cooled glass is cut into a piece having the desired size and further polished, to obtain a glass product.

Thus, the alkali-free glass prepared by the glass preparation according to an embodiment of the present invention has a density less than 2.5 g/cm$^3$, and a coefficient of thermal expansion of $3.0 \times 10^{-6}$/K to $4.0 \times 10^{-6}$/K. Also, the alkali-free glass prepared by the glass preparation according to an embodiment of the present invention can has a transformation temperature ($T_g$) higher than 670° C., an elastic modulus higher than 77 GPa, and an inherent elastic modulus higher than 31 GPa·cm$^3$/g.

Hereinafter, the present invention will be explained in more detail with reference to the following Examples. However, it should be understood that the Examples are provided for the purpose of illustrations only and to better explain to a person having ordinary skill in the art, and is not intended to limit the scope of the present invention, so other equivalents and modifications could be made thereto without departing from the spirit and scope of the present invention.

Table 1 shows the compositions and properties the glasses prepared in the Examples of the present invention, while Table 2 shows the compositions and properties the glasses prepared in the Comparative Examples.

EXAMPLES

Raw materials for each component were combined to have the compositions (wt %) as shown in Table 1, and the combined materials were put in a platinum crucible and heated to a temperature of 1600° C. for 3 hours to be melted. In the melting process, a platinum stirrer was used in stirring for 1 hour for homogenization. The melted resultant was slowly cooled to 730° C., to obtain glasses corresponding to each Example. The obtained glasses were confirmed for their composition by means of an X-ray fluorescence analysis.

Also, the obtained glasses were evaluated for the following properties, i.e., density, coefficient of thermal expansion, transformation temperature, elastic modulus and inherent elastic modulus, and the results thereof are shown in Table 1.

<Density>

The density of a glass was measured according to an Archimedes's principle.

<Coefficient of Thermal Expansion (CTE)>

The average coefficient of thermal expansion of a glass was measured using a dilatometer.

<Transformation Temperature ($T_g$)>

The $T_g$ of a glass was measured using a differential thermal analysis (DTA) instrument.

<Elastic Modulus>

The elastic modulus of a glass was measured by means of a 3-point bending test.

<Inherent Elastic Modulus>

The inherent elastic modulus of a glass was calculated by dividing the measured elastic modulus by the density of the glass.

Comparative Examples

Raw materials for each component were combined to have the compositions (wt %) as shown in Table 2, and the combined materials were put in a platinum crucible and heated to a temperature of 1600 to 1700° C. for 3 hours to be melted. In the melting process, a platinum stirrer was used in stirring for 1 hour for homogenization. The melted resultant was slowly cooled to 730° C., to obtain glasses corresponding to each Comparative Example.

The obtained glasses were evaluated for the following properties, i.e., density, coefficient of thermal expansion, transformation temperature, elastic modulus and inherent elastic modulus, and the results thereof are shown in Table 2.

TABLE 1

| | Examples | | | | | | | | | |
|---|---|---|---|---|---|---|---|---|---|---|
| | 1 | 2 | 3 | 4 | 5 | 6 | 7 | 8 | 9 | 10 |
| $SiO_2$ | 72.1 | 72.3 | 72.1 | 74.5 | 71.4 | 73.8 | 73.8 | 74.8 | 73.6 | 71.5 |
| $B_2O_3$ | 2.0 | 2.8 | 2.3 | 2.6 | 2.6 | 1.9 | 1.2 | 2.5 | 2.1 | 2.3 |
| $Al_2O_3$ | 12.5 | 9.5 | 10.5 | 8.5 | 10.3 | 8.9 | 9.1 | 7.2 | 8.7 | 11.2 |
| MgO | 1.2 | 2.1 | 1.7 | 2.8 | 3.1 | 1.6 | 3.8 | 3.2 | 4.5 | 5.0 |
| CaO | 1.7 | 4.6 | 5.8 | 2.5 | 4.2 | 6.2 | 2.7 | 3.1 | 3.5 | 2.6 |
| SrO | 7.3 | 5.1 | 4.3 | 5.6 | 4.3 | 4.5 | 4.3 | 4.6 | 4.2 | 4.2 |
| BaO | 3.2 | 3.6 | 3.3 | 3.5 | 4.1 | 3.1 | 5.1 | 4.6 | 3.4 | 3.2 |
| Density [g/cm$^3$] | 2.490 | 2.493 | 2.489 | 2.471 | 2.490 | 2.484 | 2.493 | 2.481 | 2.479 | 2.482 |
| CTE [$10^{-6}$/K] | 3.12 | 3.44 | 3.45 | 3.17 | 3.45 | 3.54 | 3.32 | 3.36 | 3.39 | 3.30 |
| $T_g$ [° C.] | 687 | 685 | 687 | 686 | 685 | 687 | 688 | 684 | 682 | 687 |
| Elastic Modulus [GPa] | 77.6 | 78.1 | 78.4 | 78.3 | 79.4 | 79.2 | 80.4 | 80.6 | 81.3 | 81.5 |
| Inherent Elastic Modulus [GPa · cm$^3$/g] | 31.2 | 31.3 | 31.5 | 31.7 | 31.9 | 31.9 | 32.3 | 32.5 | 32.8 | 32.8 |

TABLE 2

| | Comparative Examples | | | | | | | | | |
|---|---|---|---|---|---|---|---|---|---|---|
| | 1 | 2 | 3 | 4 | 5 | 6 | 7 | 8 | 9 | 10 |
| $SiO_2$ | 76.5 | 66.1 | 69.3 | 74.3 | 69.3 | 70.1 | 68.7 | 69.2 | 55.0 | 71.9 |
| $B_2O_3$ | 2.5 | 2.3 | 4.5 | 2.1 | 1.3 | 1.7 | 1.5 | 2.0 | 2.1 | 2.2 |
| $Al_2O_3$ | 10.5 | 8.2 | 12.0 | 1.3 | 4.8 | 4.5 | 5.1 | 5.3 | 8.9 | 14.8 |
| MgO | 1.3 | 5.3 | 2.1 | 3.5 | 11.7 | 1.5 | 2.2 | 1.8 | 4.6 | 1.5 |
| CaO | 1.5 | 6.2 | 2.7 | 5.8 | 2.7 | 13.7 | 2.3 | 3.2 | 8.2 | 1.9 |
| SrO | 4.2 | 6.3 | 5.1 | 6.8 | 5.3 | 4.8 | 14.6 | 6.2 | 6.9 | 4.5 |
| BaO | 3.5 | 5.6 | 4.3 | 6.2 | 4.9 | 3.7 | 5.6 | 12.3 | 14.3 | 3.2 |
| Density [g/cm³] | 2.435 | 2.627 | 2.503 | 2.590 | 2.592 | 2.605 | 2.682 | 2.669 | 2.878 | 2.471 |
| CTE [$10^{-6}$/K] | 2.26 | 4.37 | 2.96 | 4.24 | 4.30 | 5.06 | 4.28 | 4.03 | 5.93 | 2.48 |
| $T_g$ [° C.] | 689 | 666 | 677 | 656 | 664 | 655 | 665 | 672 | 675 | 702 |
| Elastic Modulus [GPa] | 75.0 | 86.1 | 75.9 | 82.4 | 90.6 | 82.5 | 80.5 | 80.0 | 86.8 | 76.1 |
| Inherent Elastic Modulus [GPa · cm³/g] | 30.8 | 32.8 | 30.3 | 31.8 | 34.9 | 31.7 | 30.0 | 30.0 | 30.1 | 30.8 |

As shown in Tables 1 and 2, the glasses of Examples 1 to 10 exhibit a density less than 2.5 g/cm³, an average coefficient of thermal expansion (CTE) of 3.0 to 4.0 (×$10^{-6}$/K), as well as a $T_g$ higher than 670° C., an elastic modulus higher than 77 GPa, and an inherent elastic modulus higher than 31 GPa·cm³/g.

In contrast, it is confirmed that the glasses of Comparative Examples 1 to 10 exhibit their density and coefficient of thermal expansion higher than those of the Examples, and exhibit their $T_g$, elastic modulus and inherent elastic modulus lower than those of the Examples.

From the comparison of the Examples and the Comparative Examples, the glass of the present invention has good characteristics and can be more suitably used as a substrate for a display. Also, the glass of the present invention has good heat-resistance due to its high $T_g$, as well as superior mechanical stability due to its high elastic modulus and inherent elastic modulus.

Thus, the present invention has been described in detail by specific embodiments and drawings. However, it should be understood that the specific embodiments and drawings are given by way of illustration only, not intending to limit the present invention, and thus various changes and modifications may be made by those skilled in the art to the invention which also fall within the scope of the invention as defined as the appended claims.

What is claimed is:

1. An alkali-free glass comprising no alkali metal oxide and comprising, based on the total weight of oxides present therein,
   71 to 75 wt % of $SiO_2$;
   1 to 2.8 wt % of $B_2O_3$;
   4 to 9.5 wt % of $Al_2O_3$;
   1 to 6 wt % of MgO;
   1 to 11 wt % of CaO;
   5.1 to 9 wt % of SrO; and
   3 to 7 wt % of BaO,
   wherein the alkali-free glass has an elastic modulus higher than 77 GPa, and an inherent elastic modulus higher than 31 GPa·cm³/g, and density less than 2.5 g/cm³.

2. The alkali-free glass according to claim 1, which comprises, based on the total weight of oxides present therein,
   71 to 75 wt % of $SiO_2$;
   1.5 to 2.5 wt % of $B_2O_3$;
   5 to 9.5 wt % of $Al_2O_3$;
   1 to 5 wt % of MgO;
   1 to 8 wt % of CaO;
   5.1 to 6.5 wt % of SrO; and
   3 to 6 wt % of BaO.

3. The alkali-free glass according to claim 1, wherein the amount of MgO+CaO+SrO+BaO is in the range of 10.1 to 21 wt % based on the total weight of oxides present therein.

4. The alkali-free glass according to claim 1, wherein the amount of MgO+CaO+SrO+BaO is in the range of 11 to 19 wt % based on the total weight of oxides present therein.

5. The alkali-free glass according to claim 1, wherein the amount of $SiO_2$+$Al_2O_3$ is in the range of 79 to 84.5 wt % based on the total weight of oxides present therein.

6. The alkali-free glass according to claim 1, which has a coefficient of thermal expansion of 3.0×10–6/K to 4.0×10–6/K.

7. The alkali-free glass according to claim 1, which has a transformation temperature higher than 670° C.

8. A display device comprising the alkali-free glass according to claim 1.

9. The display device according to claim 8, which is a liquid crystal display.

10. A method for preparing an alkali-free glass, comprising combining raw materials of glass to obtain an alkali-free glass comprising no alkali metal oxide and comprising, based on the total weight of oxides present therein,
    71 to 75 wt % of $SiO_2$;
    1 to 2.8 wt % of $B_2O_3$;
    4 to 9.5 wt % of $Al_2O_3$;
    1 to 6 wt % of MgO;
    1 to 11 wt % of CaO;
    5.1 to 9 wt % of SrO; and
    3 to 7 wt % of BaO,
    wherein the prepared alkali-free glass has an elastic modulus higher than 77 GPa, and an inherent elastic modulus higher than 31 GPa·cm³/g, and density less than 2.5 g/cm³.

11. The method for preparing an alkali-free glass according to claim 10, wherein the combination of raw materials is carried out for the alkali-free glass to comprise, based on the total weight of oxides present therein,
    71 to 75 wt % of $SiO_2$;
    1.5 to 2.5 wt % of $B_2O_3$;
    5 to 9.5 wt % of $Al_2O_3$;

1 to 5 wt % of MgO;
1 to 8 wt % of CaO;
5.1 to 6.5 wt % of SrO; and
3 to 6 wt % of BaO.

12. The method for preparing an alkali-free glass according to claim 10, wherein the combination of raw materials is carried out for the amount of MgO+CaO+SrO+BaO to be in the range of 10.1 to 21 wt % based on the total weight of oxides present in the glass.

13. The method for preparing an alkali-free glass according to claim 10, wherein the combination of raw materials is carried out for the amount of MgO+CaO+SrO+BaO to be in the range of 11 to 19 wt % based on the total weight of oxides present in the glass.

14. The method for preparing an alkali-free glass according to claim 10, wherein the combination of raw materials is carried out for the amount of $SiO_2+Al_2O_3$ to be in the range of 79 to 84.5 wt % based on the total weight of oxides present in the glass.

15. The method for preparing an alkali-free glass according to claim 10, wherein the prepared alkali-free glass has a coefficient of thermal expansion of $3.0\times10-6/K$ to $4.0\times10-6/K$.

16. The method for preparing an alkali-free glass according to claim 10, wherein the prepared alkali-free glass has a transformation temperature higher than 670° C.

\* \* \* \* \*